Oct. 21, 1924.

A. H. LEIPERT 1,512,472

REENFORCEMENT FOR FRAMES OF MOTOR VEHICLES

Filed Aug. 13, 1921

INVENTOR
August H. Leipert
BY
Redding & Greeley
ATTORNEYS

Patented Oct. 21, 1924.

1,512,472

UNITED STATES PATENT OFFICE.

AUGUST H. LEIPERT, OF COLLEGE POINT, NEW YORK, ASSIGNOR TO INTERNATIONAL MOTOR COMPANY, OF NEW YORK, N. Y., A CORPORATION OF DELAWARE.

REENFORCEMENT FOR FRAMES OF MOTOR VEHICLES.

Application filed August 13, 1921. Serial No. 492,081.

*To all whom it may concern:*

Be it known that I, AUGUST H. LEIPERT, a citizen of the United States, residing in the borough of Queens of the city of New York, in the State of New York, have invented certain new and useful Improvements in Reenforcements for Frames of Motor Vehicles, of which the following is a specification, reference being had to the accompanying drawing, forming a part hereof.

This invention relates to an improved means for reinforcing the frames of motor vehicles and is designed primarily with reference to the reenforcement of the undersides of the longitudinally extending side frame members against bending stresses. In the preferred form of the invention it is proposed to clamp a relatively stiff reenforcement beam of appreciable length against the frame member to be reinforced by means of an adjustable truss or strap, the ends of which are secured in brackets carried by said member. One of the principal objects of the invention is to provide a reenforcement beam for the purpose described which shall be of such form as most effectually to resist the bending stresses and to associate therewith a retaining strap which is of simple construction and readily adjusted in place and secured with respect to the reinforced frame and the reinforcing beam so as to hold the latter most certainly against displacement.

These and other objects will appear more fully hereinafter in connection with the detailed description of the preferred embodiment illustrated in the drawing wherein, Figure 1 is a view in side elevation of the chassis of a motor truck showing the improved reenforcement applied to the underside of one of the side frame members thereof.

Figure 1:
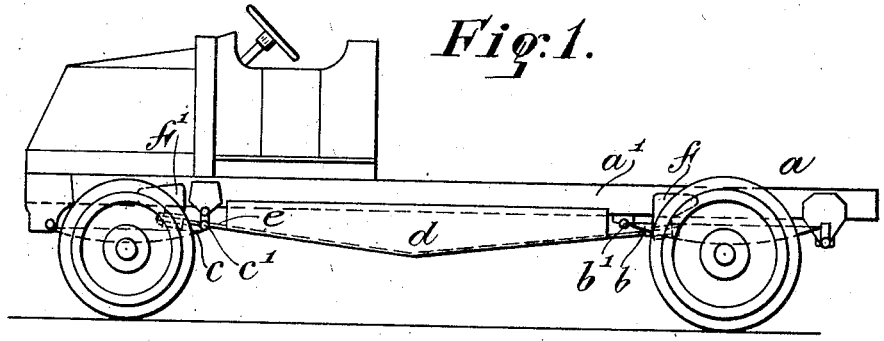
Figure 2:
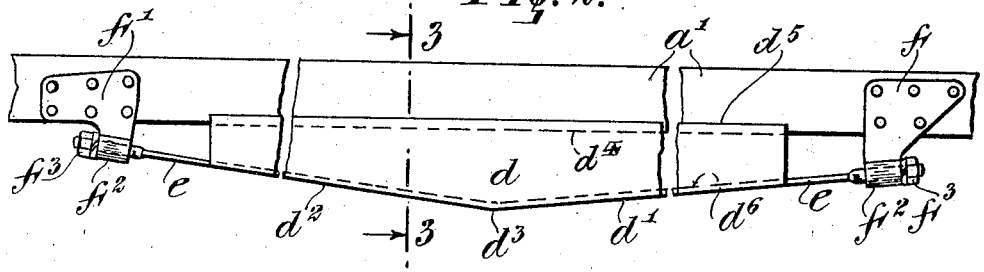
Figure 2 is a fragmentary detail view on a somewhat larger scale showing more clearly the relation between the reinforced frame, the reinforcing beam and the retaining strap.
Figure 3:
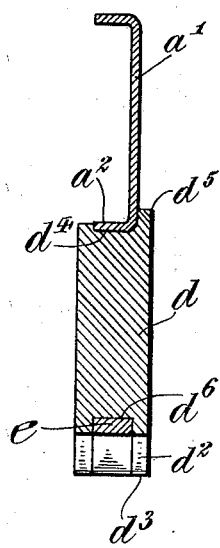
Figure 3 is a detail view in transverse section through the improved beam and strap and taken on the plane indicated by the line 3—3 of Figure 2 and looking in the direction of the arrows.

The chassis $a$ of the motor vehicle includes as usual longitudinally extending side frame members, one of which is indicated at $a'$. Since the other side frame member is similar and the improved reenforcement applicable thereto in the manner to be described it is unnecessary to make further reference thereto. The side frame member $a'$, which is usually of channeled form, as indicated in Figure 3, is, of course, subject to bending stresses under load at points between its supporting springs $b$, $c$, and this invention, in its particular application, is concerned with the reenforcement of the frame member at such point. The reinforcing beam $d$ is preferably formed longitudinally with reversely inclined lower edges, indicated at $d'$, $d^2$, whereby the maximum thickness will be found adjacent its mid-section, indicated at $d^3$. While the invention is not to be limited to the material of which this beam is made it is necessary to accomplish the objects of the invention to make it of such character as effectually to resist bending stresses impressed thereon from the frame $a'$. Wood will ordinarily be suitable for the purpose. The upper edge of the beam $d$ is grooved, as at $d^4$, to receive snugly the lower flange $a^2$ of the frame member $a'$. The upper edge of the beam may be extended upwardly at one side of the groove $d^4$, as indicated at $d^5$, to give a shouldered bearing surface against the face of the frame $a'$. The lower edge of the beam $d$ is also grooved, as indicated at $d^6$, to receive an adjustable retaining strap $e$, which extends entirely along the lower edge of the beam and has its ends anchored in brackets $f$, $f'$ secured to the side frame member $a'$ at suitable points. Some advantage may be found in placing these brackets $f$ beyond the spring eyes $b'$, $c'$, respectively, with reference to the beam $d$, although the invention is not to be so limited. The strap $e$ for strength may be of rectangular cross section where it rests within the groove $d^6$, although its ends may be cylindrical to pass through bearing eyes $f^2$ formed with the brackets $f$, $f'$. The ends of the strap $e$ will be threaded to receive nuts $f^3$ which may be set up to tighten the strap and clamp the beam $d$ between it and the frame $a'$ with such a degree of tightness as may be found desirable.

The entire construction, as pointed out hereinbefore, is such as to insure effective reenforcement against bending stresses on the frame $a'$ and to facilitate the assembling and disassembling of the reinforcing and retaining elements and insure the clamping of the reinforcing beam $d$ in fixed relation to the frame $a'$.

Reenforcement of other sections of the chassis may be accomplished by adapting the improved elements to the situation in a manner which will be obvious to a skilled mechanic.

I claim as my invention:

The combination with the longitudinal side frame member of the chassis of a motor vehicle and springs having points of attachment thereto, of a tension strap threaded at its ends and extending beneath the frame member for a major portion of the length thereof, brackets secured to the frame member between the points of attachment of the individual springs respectively and having eyes through which the ends of the strap extend, nuts threaded on to the ends of the strap to secure it adjustably in the brackets and a wooden re-enforcing beam of greater width than the side frame member of the chassis to underlie the same for a major portion of the length thereof and formed with a recess in its upper edge to receive the lower edge of the side frame member and a flange to engage the outer face thereof to resist turning moments, the lower edge of said beam being formed with reversely inclined surfaces extending from the midsection of the beam and a longitudinal groove to receive the tension strap.

This specification signed this 11th day of August, A. D. 1921.

AUGUST H. LEIPERT.